United States Patent [19]
> Derby

[11] 4,019,628
[45] Apr. 26, 1977

[54] DISPOSAL SYSTEM

[75] Inventor: Robert L. Derby, Midland, Mich.

[73] Assignee: The Dow Chemical Company, Midland, Mich.

[22] Filed: Oct. 30, 1974

[21] Appl. No.: 519,385

Related U.S. Application Data

[62] Division of Ser. No. 353,194, April 20, 1973, Pat. No. 3,881,295.

[52] U.S. Cl. .................. 206/524.4; 252/301.1 W; 206/219; 206/524; 206/525; 229/14 B
[51] Int. Cl.² ..................... B65D 81/26; C09K 3/00
[58] Field of Search ............ 252/301.1 W; 206/219, 206/84, 523, 524, 525; 229/14 R, 14 B

[56] References Cited
UNITED STATES PATENTS

| | | | |
|---|---|---|---|
| 3,012,385 | 12/1961 | Hufft | 252/301.1 W |
| 3,169,690 | 2/1965 | Scholle | 229/14 B |
| 3,249,551 | 5/1966 | Bixby | 252/301.1 W |
| 3,338,665 | 8/1967 | Silverman | 252/301.1 W |
| 3,352,472 | 11/1967 | Cummings et al. | 229/14 B |
| 3,427,368 | 2/1969 | Anderson | 264/3 |
| 3,546,055 | 12/1970 | Spertus | 206/523 |
| 3,723,240 | 3/1973 | Skochdopole et al. | 206/523 |

Primary Examiner—William Price
Assistant Examiner—Douglas B. Farrow
Attorney, Agent, or Firm—Robert B. Ingraham

[57] ABSTRACT

Hazardous materials such as askarels, chlorinated hydrocarbons or other ecologically undesirable liquids are disposed of by gelling the liquid within a combustible package and subsequently shipping the package to a qualified disposal site, such as an incinerator, which can incinerate halogenated hydrocarbons in an ecologically sound manner.

6 Claims, 3 Drawing Figures

DISPOSAL SYSTEM

CROSS REFERENCE TO RELATED APPLICATION

This is a division of application Ser. No. 353,194 filed Apr. 20, 1973, now U.S. Pat. No. 3,881,295.

Various chlorinated hydrocarbons find wide use for a variety of purposes. Many of these chlorinated hydrocarbons, such as the polychlorinated biphenyls popularly known as PCB's, as well as other ring halogenated chlorinated materials, such as chlorinated benzene, are used in electrical applications such as transformers, switches, capacitors and the like. Although such chlorinated hydrocarbons serve a good and useful purpose in the desired location, they have undesirable side effects when uncontained. Substantial damage to wildlife is believed to be caused by the presence of such uncontained halogenated hydrocarbons or other ecologically undesirable liquids such as liquid pesticide compositions. It is believed that a significant amount of such halogenated hydrocarbons is released into the environment during various sampling and testing procedures; for example, in the periodic evaluation of the askarel in a large power transformer and careless disposition of the askarel to flush the sample in the line, and/or careless disposition of the sample itself after analysis.

It would be desirable if there were available a system for the disposition of environmentally undesirable organic liquid materials.

It would also be desirable if there were available a system for the disposition of ecologically undesirable halogenated hydrocarbon liquids.

It would further be desirable if there were available a means for the disposition of halogenated hydrocarbon organic liquids containing polychlorinated biphenyls.

These benefits and other advantages in accordance with the present invention are achieved in a method for the disposition of ecologically undesirable polymer swelling liquid such as polychlorinated biphenyls, the steps of the method comprising containing the liquid with a liquid swellable solid synthetic resinous polymer, the liquid being present in a quantity at least sufficient to form a gel, containing said gel in a shipping container and transferring said shipping container to a disposal site.

Also contemplated within the scope of the present invention is a shipping container particularly suited for the disposal of ecologically undesirable polymer swelling liquids, the shipping container comprising a combustible ecologically undesirable polymer swelling liquid impermeable hollow body defining a space therein, disposed within said space a liquid swellable synthetic resinous polymer, the polymer being present in a quantity sufficient to form a gel when an ecologically undesirable polymer swelling liquid is added to the space.

Further features and advantages of the present invention will become more apparent from the following specification taken in connection with the drawing wherein.

Figure 1:
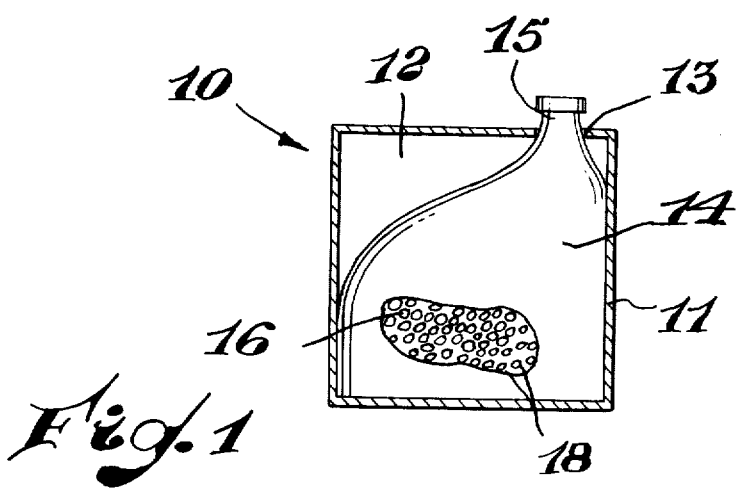
FIG. 1 depicts a partly in-section view of a container suitable for the practice of the present invention.

In FIG. 1 there is a schematic partly in-section view of a container in accordance with the present invention generally designated by the reference numeral 10. The container 10 comprises an outer rigid hollow container 11 of a combustible material, advantageously a corrugated paperboard. The container 11 has the configuration of a parallelepiped and beneficially that of a cube. The container 11 defines therein a space 12 and a passageway 13 providing communication between the space 12 and space external to the container 11. Beneficially the container 11 may be of conventional corrugated paperboard construction. Within the space 12 is disposed a flexible container 14. The flexible container 14 is beneficially generally chlorinated hydrocarbon-impermeable and is of material such as polyethylene, surface sulfonated polyethylene, vinylidene chloride polymers and the like. The container 11 has a closure 15 and defines an internal space 16 having disposed therein a plurality of swellable polymer particles 18. Beneficially, the container 14 is of sufficient size that when inflated with gas or liquid it completely or almost completely fills the space 12 within the container 11. The volume of particles 18 disposed within the container 14 beneficially is sufficient on swelling in desired polychlorinated hydrocarbon to completely fill the space 12 while the particles are in a gelatinous condition.

Figure 2:
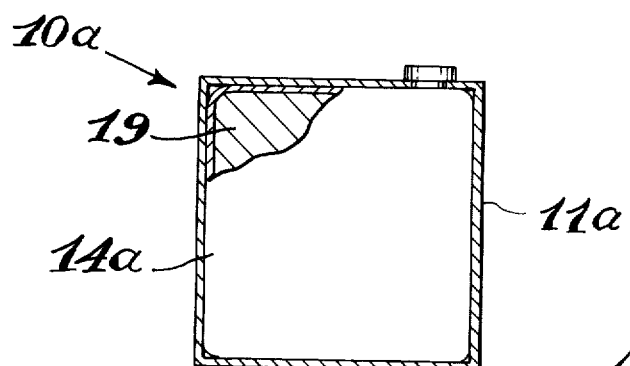
FIG. 2 depicts a container similar to that of FIG. 1 filled with a chlorinated hydrocarbon.

In FIG. 2 there is a sectional view of a container 10a generally in accordance with FIG. 1 which has been filled with a chlorinated hydrocarbon. The container 10a has a rigid outer container 11a, a flexible inner container 14a which contains swollen gelatinous material 19 resulting from swelling of particles such as the particles 18 by the addition of an appropriate chlorinated hydrocarbon such as a polychlorinated hydrocarbon dielectric liquid; that is, an askarel. The gelatinous mass 19 beneficially is sufficiently viscous that on rupture of one or more walls of the container 10a the material does not flow as a low viscosity liquid but can be collected as a gel, for example, with a shovel, and placed in a readily available container such as a plastic bag, box or the like until appropriate disposal can be made.

Figure 3:
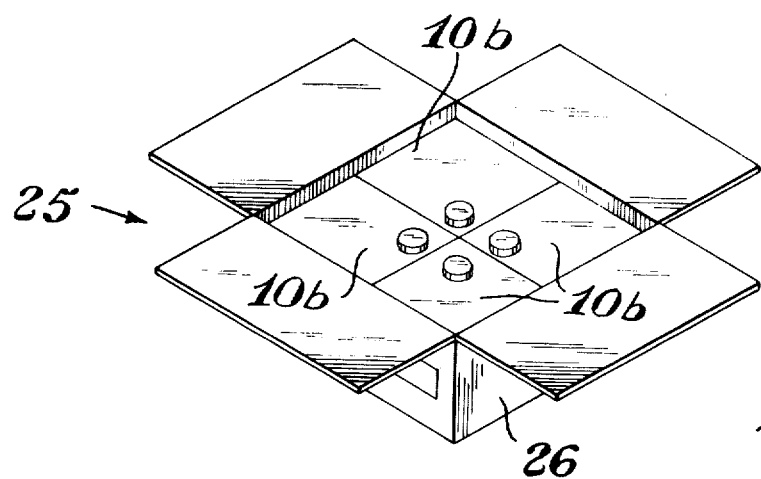
FIG. 3 depicts a plurality of containers such as those in FIG. 2 prior to closure for shipping.

FIG. 3 depicts a container generally designated by the reference numeral 25. The container 25 comprises an addressed or prepaid addressed shipping box 26 which has not yet been closed for shipping. Within the box 26 are disposed four containers designated by the reference numeral 10b which are generally similar to the filled containers 10a of FIG. 2.

In the practice of the method of the present invention, a container such as the container 10 of FIG. 1 is filled with an askarel or other ecologically undesirable polymer-swelling liquid which one wishes to discard. The container may be either completely or partly filled, depending on the quantity of material available. The swellable particles 18 then imbibe the liquid to provide a semi-solid gelatinous mass consisting of individual swollen close-packed polymer particles. The container is then closed and desirably can be shipped to a disposal site having facilities to dispose of the container liquid in an ecologically desirable manner. Usually such disposal is accomplished by burning, and it is highly desirable that at least a major portion of the container be of a combustible material such as synthetic resinous plastic, paperboard and the like.

Although as illustrated in FIG. 1, the container comprises two portions, a rigid permeable outer member and a flexible generally liquid impermeable inner member, in certain instances the outer container 11 may be dispensed with and individual bags packed in a single shipping container or placed in a suitable shipping container or a plurality of such bags or containers placed in a shipping container in the manner depicted in FIG. 3. Oftentimes rigid plastic containers may be employed. However, at the present time the arrangement as depicted in FIG. 1 is found to be economical and generally satisfactory, as the rigid outer container provides mechanical protection for the inner flexible container. Such containers are commercially available under the trade designation of "Cubitainer".

Polymers useful in the practice of the present invention are any polymers which swell on contact with polychlorinated organic dielectric liquids or other ecologically undesirable organic liquids. Useful polymers may swell on contact with water. However, additional swelling must occur when contacted with an organic dielectric liquid. Selection of a polymer for use with any organic dielectric liquid is readily accomplished by determining a swelling index for the polymer particles. Beneficially, such a swelling index is readily determined by measuring the volume of a particulate polymer to be evaluated and subsequently adding the desired organic liquid and determining the volume of swollen polymer after a period of 48 hours in the organic liquid. The ratio of the volume with organic liquid to volume of the unswollen polymer provides the swelling index. If the polymer is soluble, the swelling index is infinite. If the swelling index is greater than about 2, the polymer particles are useful in the practice of the present invention. Beneficially for most applications, a swelling index of at least 3 and preferably greater than about 5 is desirable. It is critical to the practice of the present inventon to employ a cross-linked polymer which swells but does not dissolve. If the polymer swells in the presence of the organic liquid, it is suitable for the practice of the present invention. However, for most applications it is desirable to employ a polymer which is cross-linked to a sufficient degree that it exhibits a swelling index between about 2 and 50, and preferably between about 5 and 50. By utilizing the cross-linked polymer, the hazard of dissolution of the polymer over extended periods of time is eliminated. A wide variety of polymeric materials are employed with benefit. Such polymers include polymers of styrene and substituted styrenes; copolymers of vinyl chloride such as a copolymer of 60 weight percent vinyl chloride and 40 weight percent vinyl acetate; vinylidene chloride copolymers such as a copolymer of 75 percent vinylidene chloride and 25 percent acrylonitrile; acrylic polymers such as polymers of methylmethacrylate, ethyl acrylate and the like. In general the chemical composition of the polymers is not critical. The polymers must show significant swelling; that is, at least a 25 percent increase in volume in a period of up to 24 hours in the organic liquid to which the polymers are required to respond under desired service conditions of temperature and pressure. Particularly advantageous materials which respond to a wide variety of organic liquids are polymers of styrene such as polystyrene and polymers of styrene and divinylbenzene containing up to about 10 weight percent divinylbenzene. For general use with polychlorinated hydrocarbons, alkylstyrene polymers are of particular benefit. Such alkylstyrene polymers swell very rapidly on contact with aliphatic and/or aromatic hydrocarbons. Alkylstyrene polymers usually show substantial swelling when in contact with organic liquids in less than one minute.

Preferably, cross-linked polymers of styrene, and advantageously of alkylstyrenes, are utilized as the imbibing agent in the present invention. Those alkylstyrenes which can be used to prepare these polymers have alkyl groups containing from 1 to 20, and preferably from 4 to 12, carbon atoms, such as: tertiary-alkylstyrenes including for example p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecylstyrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and sec-eicosylstyrene; isoalkylstyrenes including for example, isobutylstyrene, isoamylstyrene, isohexylstyrene, isooctylstyrene, isododecylstyrene, isooctadecylstyrene and isoeicosylstyrene; and copolymers thereof.

Especially preferred for use in the practice of the invention are cross-linked copolymers of such alkylstyrenes as heretofore described and an alkyl ester derived from a $C_1$ to $C_{18}$ alcohol and acrylic or methacrylic acid or mixtures thereof.

Suitable monomers which may be employed as comonomers with the alkylstyrene include such materials as vinylnaphthalene, styrene, α-methylstyrene, ring-substituted α-methylstyrenes, halostyrenes, arylstyrenes and alkarylstyrenes; methacrylic esters, acrylic esters, fumarate esters and half esters, maleate esters and half esters, itaconate esters and half esters, vinyl biphenyls, vinyl esters of aliphatic carboxylic acid esters, alkyl vinyl ethers, alkyl vinyl ketones, α-olefins, isoolefins, butadiene, isoprene, dimethylbutadiene, acrylonitrile, methacrylonitrile and the like.

It is desirable that the polymers used in the process of the invention contain a slight amount of cross-linking agent, preferably in the range of from about 0.01 to 2 percent by weight. The most efficient imbibition of organic liquids occurs when the level of cross-linking agent is less than about 1 percent since this permits the polymers to swell easily and imbibe a substantial volume of the organic material.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinyl isopropenylbenzene, divinylbiphenyl, as well as any other di- or poly-functional compound known to be of use as a cross-linking agent in polymeric vinyl-addition compositions. Normally, the polymer containing the cross-linking agent swells with the imbibed organic material. If there is too much cross-linking agent, the quantity of material imbibed is often insufficient for most applications. If the imbibitional polymer particles contain no cross-linking agent or too little cross-linking agent, then it will dissolve eventually in the organic material resulting, for example, in a non-discrete, non-particulate mass of polymer-thickened organic liquid which is sticky and gathered together with more difficulty than when cross-linked particles are employed. Cross-linking of polymers and the preparation of such polymers is well known in the art and is discussed at great length in THE ENCYCLOPEDIA OF POLYMER SCIENCE AND TECHNOLOGY, Vol. 4, pages 331-414, John Wiley & Son, Inc., 1966, which is herewith incorporated by reference.

Polymers for the practice of the method of the present invention may be prepared by any convenient technique, either suspension, emulsion or mass polymerization. Generally, the method of preparation is selected to provide polymer in the most convenient form for any particular application. Thus, if it is desired to have free-flowing, readily packed beads or particles, generally suspension polymerization is employed to provide a plurality of small beads. If it is desired to obtain beads or particles having the maximum amount of polymer surface and a relatively high imbibition rate, it is oftentimes desirable to employ an emulsion polymerization technique and recover the polymer by spray drying. If it is desired to obtain a body or particles of pre-determined configuration, it is oftentimes beneficial to employ a mass polymerization technique wherein a polymer-insoluble diluent is employed. Techniques for the preparation of such porous polymers are disclosed in U.S. Pat. No. 3,322,695, the teachings of which are herewith incorporated by reference. Such porous polymers can also be prepared by either suspension or mass polymerization. Alternately, satisfactory particles are prepared by mass or suspension polymerization with subsequent comminution of the polymer prepared by the mass technique. The particle size of such polymers is selected in accordance with the desired rate of imbibition, larger particles being employed for slower imbibition, smaller particles for rapid imbibition. For most applications, such particles are from about 0.1 to 5 millimeters in diameter. Alternately, porous polymer particles may be polymerized in desired shapes in the manner of U.S. Pat. No. 3,322,695. The size of the particles has a significant effect on the rate of imbibing by the particles. For rapid imbibition usually it is desirable to employ particles having diameters of 500 microns or less, and to periodically shake the container and contents until gelation or swelling is complete. In order to optimize each application, factors such as temperature, configuration, quantity of fluid, the presence of water and the like must be considered. If the polymer body has water therein, imbibition is somewhat slower than the water is absent.

The selection of materials for the containers such as the container 14 is well within the skill of anyone in the art. The containers need only be generally impermeable to the liquid to be packaged therein under normal shipping conditions. Materials such as polyethylene, polypropylene, surface sulfonated polyethylene, polypropylene and resinous copolymers thereof are eminently satisfactory. Other materials are readily evaluated by placing a portion of the material to be handled within a pouch prepared from the material and allowing it to remain within the pouch at 100° F. for a period of one week. If the pouch does not rupture, it is satisfactory for use in the present invention.

By way of further illustration, a commercially available container of one gallon size generally as depicted in FIG. 1 and available under the trade designation of Cubitainer is employed. Approximately 1.33 pounds of styrene polymer beads passing 20 mesh and being retained on 80 mesh (US Sieve Size) screens and lightly cross-linked with 0.1 part by weight divinylbenzene per 100 parts by weight of styrene to provide a polymer having a swelling index in toluene of 12.5, are positioned within the container. By "swelling index" is meant the ratio of the volume of the toluene-swollen beads to the unswollen polymer particles as determined at 25° C. at equlibrium swelling. The container is subsequently filled with a commercially available askarel removed for sampling purposes from transformers. Within a period of about one half hour no liquid is observed within the container and the contents appear to be a rigid gel. Three like containers are prepared and all four containers are placed in a shipping container and shipped by commercial carrier a distance of about 600 miles. No damage to either the inner containers or the shipping containers is observed. One of the sample containers is opened and a portion of the contents expelled onto a concrete floor from which it is readily recovered by means of a scoop shovel. The containers are subsequently destroyed by incineration at an approved site.

In a manner similar to the foregoing, a wide variety of ecologically undesirable materials are readily packaged and destroyed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A shipping container particularly suited for the disposal of ecologically undesirable polymer swelling chlorinated hydrocarbon liquids, the shipping container comprising
a combustible ecologically undesirable chlorinated hydrocarbon polymer swelling liquid-impermeable hollow body defining
a space therein, disposed within said space
a chlorinated hydrocarbon liquid swellable crosslinked synthetic resinous polymer which swells but does not dissolve in the liquids, the polymer being present in a quantity sufficient to form a gel when an ecologically undesirable polymer swelling chlorinated hydrocarbon liquid is added to the space.

2. The container of claim 1 wherein the polymer is a styrene polymer.

3. The container of claim 1 wherein the hollow body comprises a first or inner layer of a plastic and a second or outer layer of corrugated paperboard.

4. The container of claim 1 wherein the hollow body has a generally rectangular configuration.

5. A plurality of containers in accordance with claim 1 disposed within a container.

6. A shipping container particularly suitable for the disposal of ecologically undesirable polymer swelling chlorinated hydrocarbon liquids, the shipping container comprising a combustible ecologically undesirable polymer swelling chlorinated hydrocarbon liquid-impermeable inner plastic layer and an outer layer of corrugated paperboard defining a space therein disposed within the space chlorinated hydrocarbon liquid swellable crosslinked synthetic resinous polymer particles which swell but do not dissolve in the liquids, the polymer particles being present in a quantity sufficient to form a gel when an ecologically undesirable chlorinated hydrocarbon polymer swelling liquid is added to the space within the container.

* * * * *